(No Model.) 4 Sheets—Sheet 2.
H. LEINEWEBER.
BICYCLE ATTACHMENT.
No. 566,083. Patented Aug. 18, 1896.
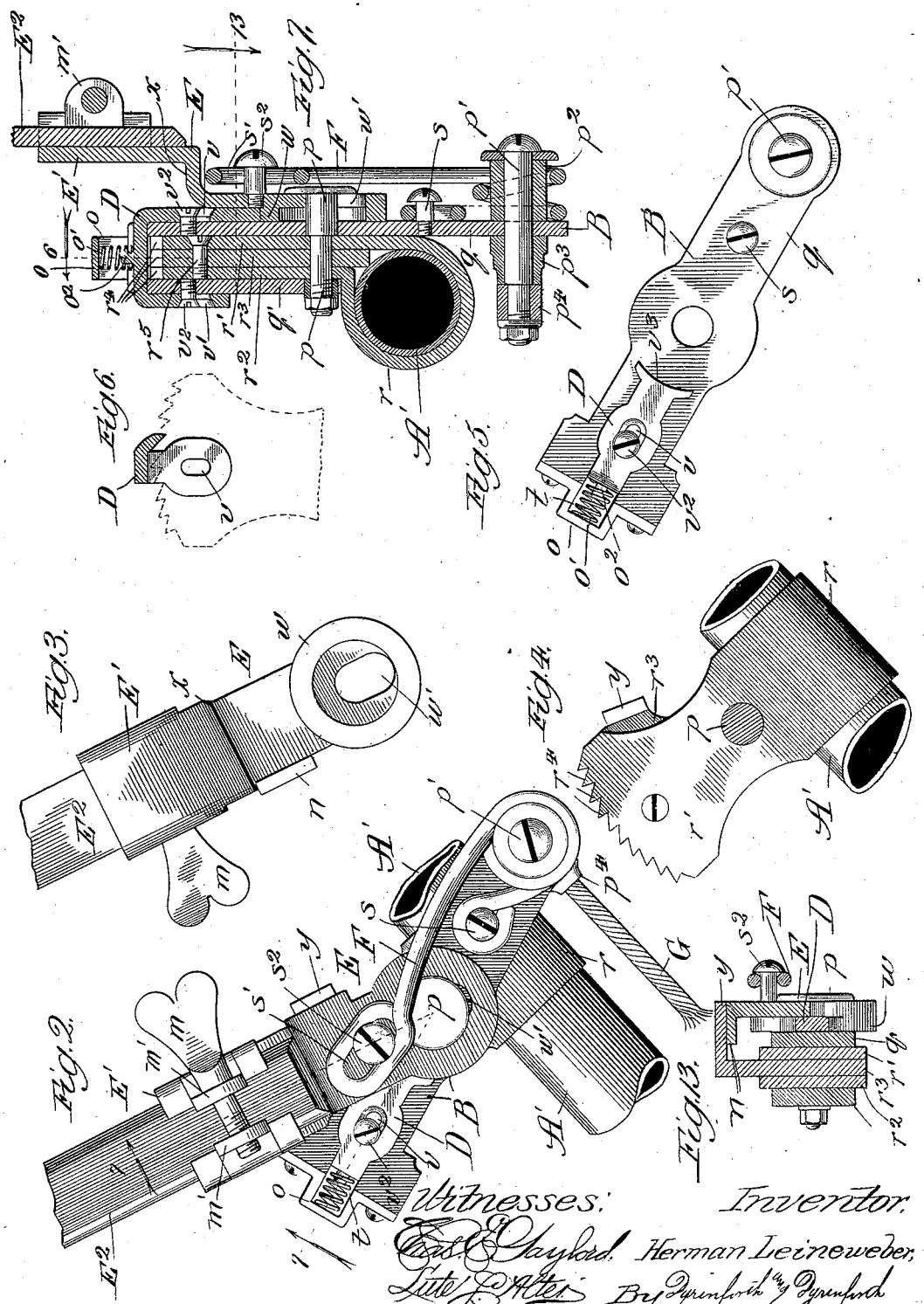
Witnesses: Inventor.
Herman Leineweber,
By Dyrenforth & Dyrenforth
Attys.

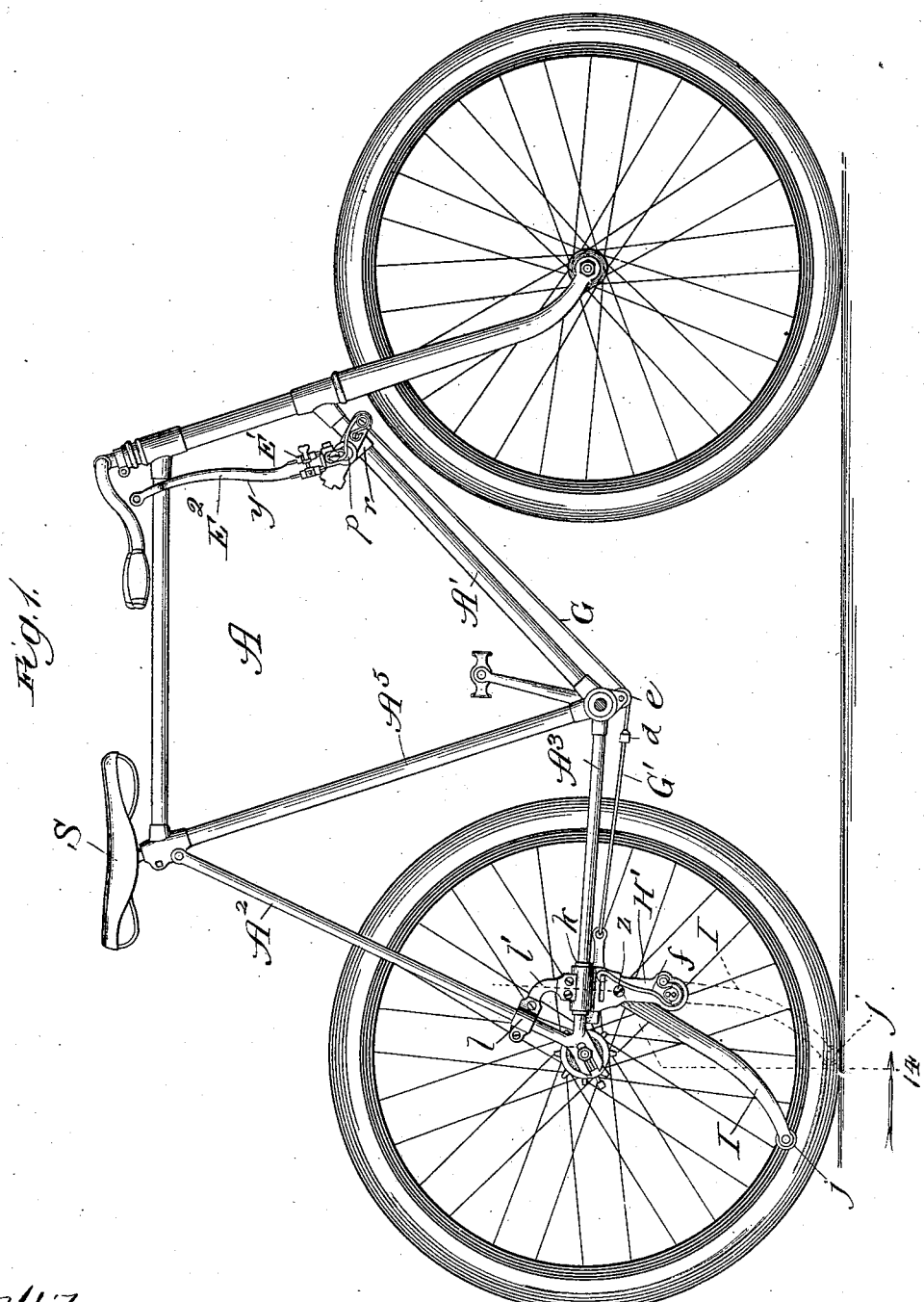

(No Model.) 4 Sheets—Sheet 3.
H. LEINEWEBER.
BICYCLE ATTACHMENT.
No. 566,083. Patented Aug. 18, 1896.
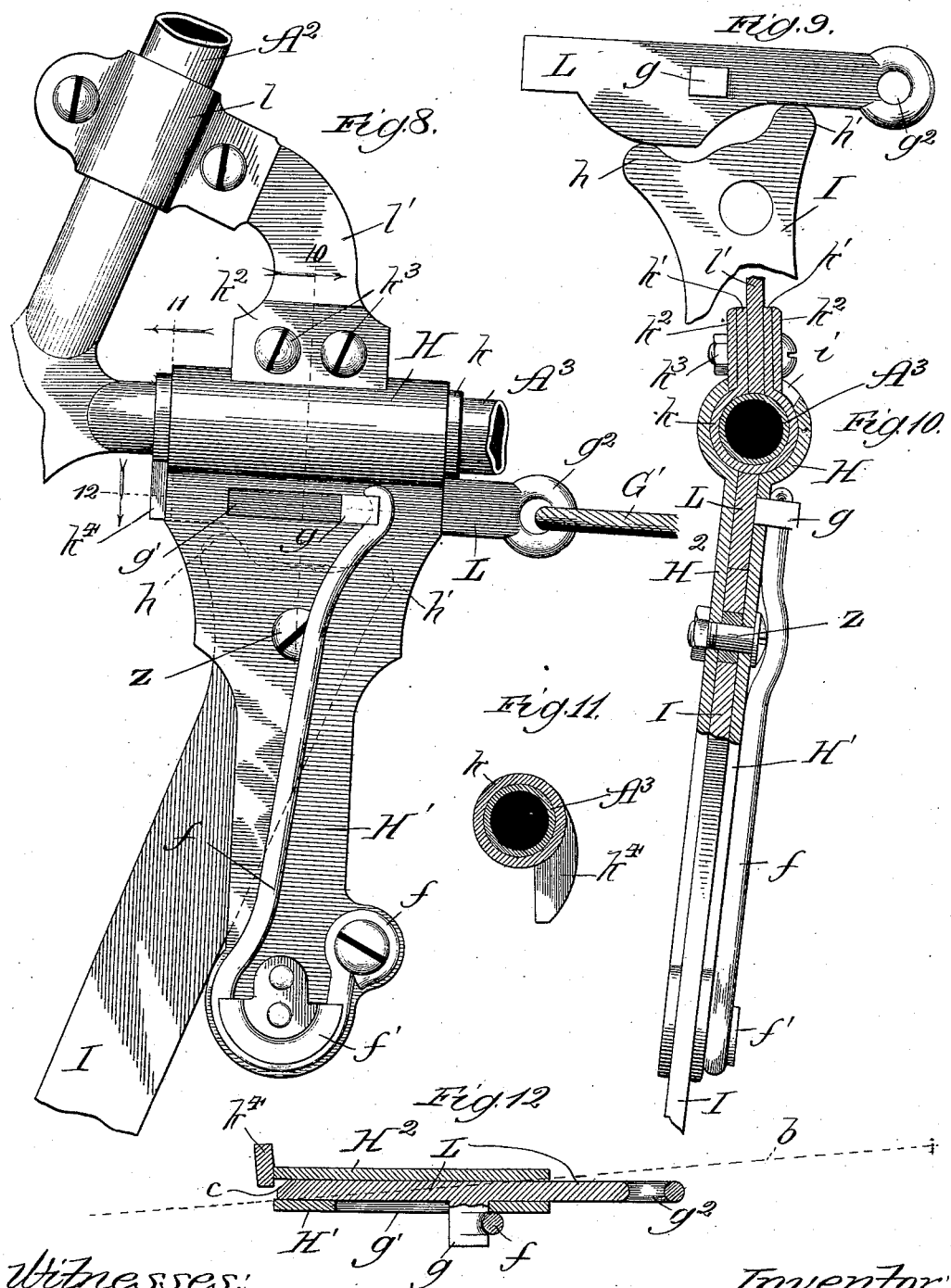

(No Model.) 4 Sheets—Sheet 4.
H. LEINEWEBER.
BICYCLE ATTACHMENT.
No. 566,083. Patented Aug. 18, 1896.
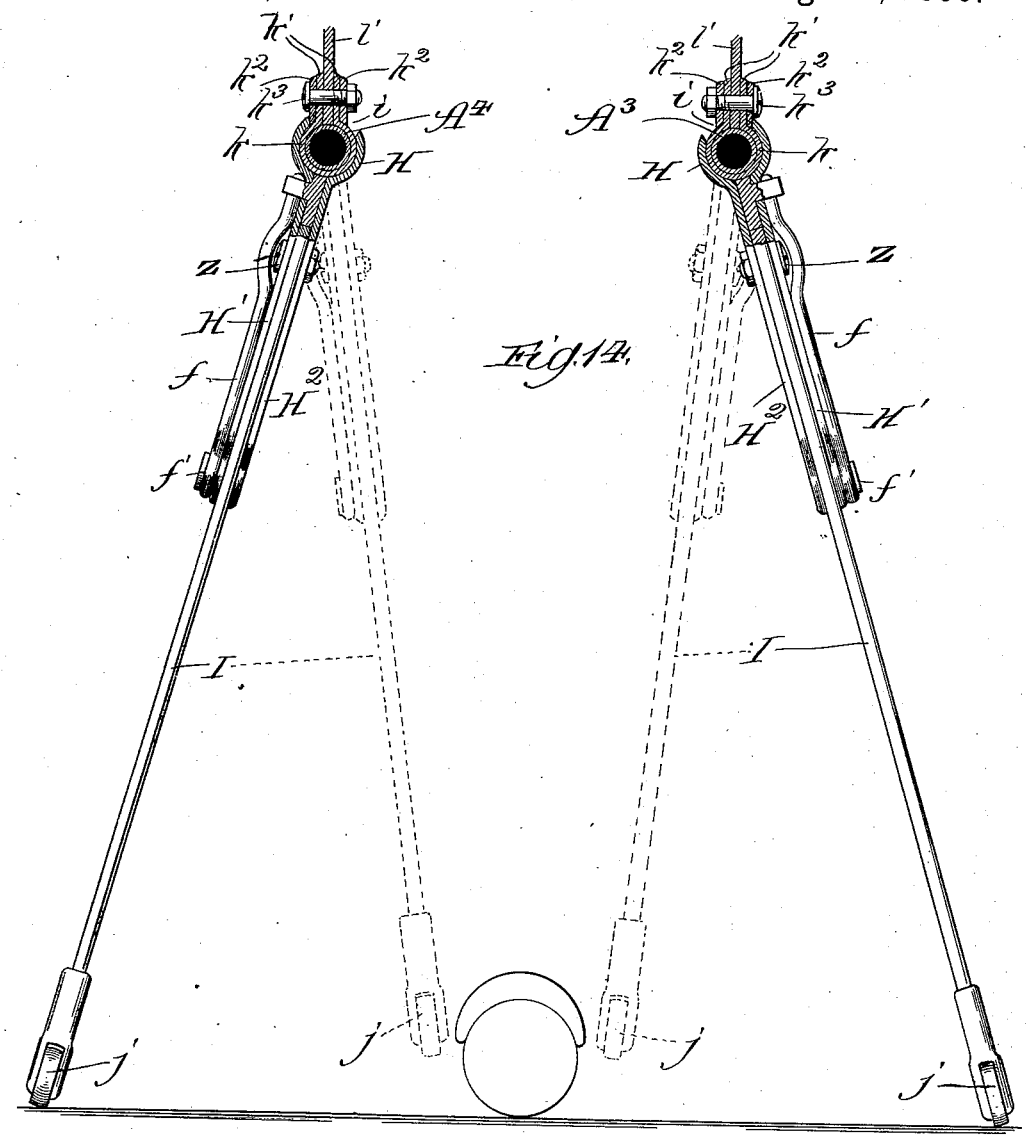
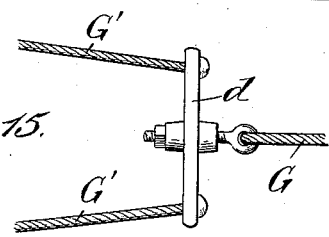
Witnesses:
Inventor:
Herman Leineweber,
By Dyrenforth and Dyrenforth,
Att'ys.

UNITED STATES PATENT OFFICE.

HERMAN LEINEWEBER, OF CHICAGO, ILLINOIS, ASSIGNOR OF TWO-FIFTHS TO SIGMUND FREUDENBERG, OF SAME PLACE.

BICYCLE ATTACHMENT.

SPECIFICATION forming part of Letters Patent No. 566,083, dated August 18, 1896.

Application filed November 25, 1895. Serial No. 570,113. (No model.)

*To all whom it may concern:*

Be it known that I, HERMAN LEINEWEBER, a citizen of the United States, residing at Chicago, in the county of Cook and State of Illinois, have invented a new and useful Improvement in Bicycle Attachments, of which the following is a specification.

The primary object of my invention is to provide an attachment on a bicycle which shall be adjustable to support the bicycle, when at rest, in upright position with or without the rider mounted thereon, whereby it may be caused to stand erect when out of use, and whereby the rider may mount it and occupy the seat without propelling it. By means of such an attachment a person learning to ride may mount conveniently, practice mounting the bicycle and dismounting therefrom, and also working the pedals with the feet, (though then, of course, the gearing between the pedal-shaft and the shaft of the rear wheel should be disconnected.) Moreover, a rider, on bringing his bicycle, equipped with my improved attachment, to a standstill, need not dismount, but may, by manipulating a suitable handle, brace the bicycle to stand upright while he remains in his seat, either to rest or to occupy an elevated position, say as a looker-on at a race or at some other open-air event. As a further advantage of my improvement it enables a learner to practice balancing himself on the bicycle without danger of its overturning, and it also affords an effective brake. Another object of my improved attachment is to afford a safeguard or lock for preventing a would-be purloiner from making away with the bicycle by riding it off.

Referring to the accompanying drawings, Figure 1 is a view in side elevation of a safety-bicycle provided with my improved attachment; Fig. 2, a broken view, in side elevation, of that portion of my attachment which is applied to the forward part of the bicycle; Fig. 3, a similar view of a portion of the same, presenting the opposite side; Fig. 4, a similar view, with the fulcrum point shown in section, of another portion of the same; Fig. 5, a view in side elevation of parts shown in Fig. 2, but with other parts removed; Fig. 6, a section taken at the line 6 on Fig. 7 and viewed in the direction of the arrow; Fig. 7, a section taken at the lines 7 7 on Fig. 2 and viewed as indicated by the arrows; Fig. 8, a view like that presented by Fig. 2 of the parts of the attachment which are applied to the rear portion of the bicycle; Fig. 9, a broken view showing cam details; Fig. 10, a section taken at the line 10 on Fig. 8 and viewed in the direction of the arrow; Fig. 11, a section taken at the line 11 on Fig. 8 and viewed in the direction of the arrow; Fig. 12, a section taken at the line 12 on Fig. 8 and viewed in the direction of the arrow; Fig. 13, a section taken at the line 13 on Fig. 7 and viewed in the direction of the arrow; Fig. 14, a sectional view taken at the line 14 on Fig. 1 and viewed in the direction of the arrow, diagrammatic in its nature, showing the adjustment relative to the rear wheel of the bicycle of the bracing-legs; and Fig. 15, a broken view showing the means of connection between the mechanism at the rear and that at the front of the bicycle.

A is a safety-bicycle of any well-known or desired general construction. In fact, one of the advantages of my improvement consists in its being applicable to a bicycle without requiring to that end that the construction of the bicycle shall be changed in any particular to adapt it to permit the use thereon of my attachment.

On the lower chord A' of the bicycle-frame, and adjacent to the steering-bar, is supported the forward portion of the mechanism of which my improved attachment is composed and the detailed construction of which is as follows:

A sleeve $r$ is fastened about the chord A' and is extended near the outer side thereof in two upright plates $r'$ and $r^2$, which terminate at their outer ends each in a segmental series of ratchet-teeth $r^4$, and between the plates $r'$ and $r^2$ is interposed a reinforcing-plate $r^3$, also terminating at its outer end in a segmental series of ratchet-teeth $r^4$, the three parts $r'$, $r^2$, and $r^3$ being firmly secured together by the screw $r^5$. The three sets of ratchet-teeth thus formed coincide, so that they practically form one segmental set. The three plates $r'$, $r^2$, and $r^3$ are embraced transversely across their outer ends by a yoke-plate B, having a longer pendent arm $q$ and a shorter pendent arm $q'$, respectively, adjacent to the plates $r'$ and $r^2$ and fulcrumed upon a headed pin $p$, which passes through the plates and yoke-arms.

D is a yoke-shaped dog seated in a recess $t$ in the outer end of the yoke-plate B to cross the ratchet-teeth $r^4$ and embrace the arms $q$ and $q'$, to which it is reciprocably fastened through elongated openings $v$ and $v'$ by screws $v^2$, and at its outer end the dog D carries a stud $o^2$, affording a guide for a spiral spring $o'$, confined against the dog by a bracket $o$, secured to the outer end of the yoke-plate B.

E is a lever bent, as shown at $x$, and provided near the lower end on its inner face with a washer $w$ about an elongated opening $w'$ in the lower end portion of the lever, through which it is fulcrumed on the pin $p$, the washer bearing against the outer side of the arm $q$ of the yoke-plate B and fitting against the concaved expanded extremity $v^3$ of the yoke-shaped dog D. At one edge the lever E carries a projection $n$ to engage the yoke-arm $q$, as and for the purpose hereinafter described, and the outer end of the lever is formed with a split socket E' to receive the handle $E^2$, which is removably fastened at its lower end in the socket by tightening the latter through the medium of a thumb-screw $m$, working in the threaded openings of lugs $m'$, projecting from the adjacent edges of the divided socket, which, being formed of springy metal, may be tightened or loosened about the handle by turning the thumb-screw accordingly. A pin $p'$ passes through and finds bearing in the lower end portion of the arm $q$ of the yoke-plate B, and has confined upon it at one side of the arm a thimble $p^2$, about which is wound a spring F, having one end fastened to a stud $s$ on the plate and its opposite end formed into an elongated loop $s'$ and fastened through the latter by a stud $s^2$ to the lever E; and on the pin $p'$, at the opposite side of the arm $q$, is a thimble $p^3$, against which is confined, on the pin, a clip $p^4$, having fastened to it one end of the cord G, which performs a function hereinafter described. From the forward edge of the plate $r^3$ there projects a stop $y$ for the lever E.

The mechanism of my improved attachment which is applied to the rear portion of the bicycle involves the following-described construction:

On one of the two seat-post-bracing back bars $A^2$ of the rear fork of the frame A' of the bicycle, near the axle of the rear wheel, is rigidly fastened a collar $l$, from the forward end of which there extends toward the adjacent lower bar $A^3$ of the rear fork a curved finger $l'$. Near the rear axle the bar $A^3$ is surrounded by a sleeve $k$, having the upward-extending wings $k'$, which embrace the lower end of the finger $l'$ and are in turn flanked by reinforcing-plates $k^2$, the latter, the wings, and the finger being rigidly fastened together by bolts $k^3$, and at the rear end the sleeve $k$ carries a cam $k^4$. About the sleeve $k$ is a cylindrical head H, having an elongated slot $i$ in its upper side, through which the parts $l'$, $k'$, and $k^2$ pass, the slot being wider than the combined thickness of these parts, and the head H is split along its under side and is extended from along opposite sides of the split into pendent arms H' and $H^2$, between which is fulcrumed at $z$ a leg I. As shown, the leg I is slightly curved in a backward direction and is bifurcated toward its lower end, where it carries a roller $j$. The upper end of the leg I is formed with cam-shaped extremities $h$ and $h'$ at its opposite edges.

L is a cam-bar supported to slide between the pendent arms H' and $H^2$ to engage at its cam portion with the cam end of the leg I, and it carries on one side a lug or stop $g$, which projects through an elongated slot $g'$ in the arm H' for limiting the extent of motion of the cam-bar, which is provided on its forward end with a ring $g^2$. On the arm H', near its lower end, is fastened one end of a spring $f$, which passes thence about a bracing-clip $f'$ to the projecting stop $g$, which the spring engages at its free end.

Precisely the same mechanism as that described on the parts $A^2$ and $A^3$ of the rear fork of the bicycle is also provided on the part corresponding with the part $A^2$ and on the part $A^4$, Fig. 14, of the rear fork of the frame, so that the foregoing description will suffice, with this understanding, for these duplicated mechanisms.

The cord G passes from the clip $p^4$ of the mechanism at the forward part of the bicycle about a guide-pulley $e$, Fig. 1, on the lower end of the seat-post $A^5$ of the frame, and adjacent to this guide-pulley the cord is fastened to a cross-head $d$, from opposite ends of which the cord extends as branches G' G', which are respectively connected with the rings $g^2$ on the ends of the two cam-bars L.

The operation is as follows: The springs $f$ tend normally to force the cam-bars L backward to the rear ends of the slots $g'$, and thereby turn the legs I, by engagement of the cam-bars with the cam extremities $h$ and $h'$, in a forward direction on their pivots $z$ into the position indicated by dotted lines in Fig. 1, where they contact at their lower ends with the ground to brace the bicycle and support it in upright position. This tendency, however, is normally resisted by the mechanism on the forward part of the bicycle-frame, in which the ratchet-teeth $r^4$ are engaged by the dog D, under the yielding influence of the spring $o'$, to hold the yoke-plate B from being swung in a forward direction at the upper side of its frame by the force of the springs $f$. Thus, as shown in Fig. 1 and the various other figures, the parts of my improved attachment are in their normally relative positions with the legs I raised from the ground to permit it to be propelled. To cause the legs to contact with the ground, the rider, from his position on the bicycle-seat S, pulls upward on the handle $E^2$, whereby the dog D is raised against its controlling-spring $o'$, and thus frees the yoke-bar from the ratchet-teeth $r^4$, permitting the springs $f$ to act against the lugs $g$ on the cam-bars L, forcing the latter backward and causing their cam portions to act against those on the legs I and turn them on their pivots in the necessary direction to bring their feet portions or lower ends into contact with the ground. This motion of the cam-bars pulling, through the medium of the cords G G', against the pivotal yoke-bar B, turns it upon its fulcrum $p$ to a position of parallelism with the lever E. When the legs I are being thus moved forward below their fulcrums by the rearward motion of the cam-bars L, the latter being slightly beveled, as shown at $c$ in Fig. 12, on their rear ends, they contact with the cams $k^4$ on the sleeves $k$, whereby the cylindrical heads H are turned to swing the arms H' H², and the legs held between them, in an outward direction from the positions of the legs represented by the dotted lines in Fig. 14 to those represented by the full lines in that figure, whereby the bracing effect of the legs is accordingly enhanced.

It is to be borne in mind that the lower bars A³ and A⁴ of the rear fork of the bicycle-frame converge from the rear axle to the pedal-shaft, while the legs I should move parallel with each other. To cause this parallel motion of the legs, the arms H' and H² for each leg should be caused to hang parallel with each other. Accordingly I twist these arms in an outward direction toward their forward edges, but the twist in them could not well be illustrated in the drawings; so instead I have attemped to represent it diagrammatically in Fig. 12, wherein the dotted line at $b$ represents the line of one of the bars A³ or A⁴ and its oblique relation to the arms H' and H². To raise the legs I when the rider desires to proceed, he pulls in a backward direction upon the handle E², whereby the stop $n$ on the lever E, by bearing against the adjacent edge of the yoke-bar B, turns the latter on its fulcrum $p$ in a backward direction, where it is held by the engagement of the dog D with the ratchet-teeth $r^4$, and by the resultant turning of the lower end of the yoke-bar B in a forward direction it pulls on the cord G G', thereby pulling forward the cam-bars L, and, by the engagement of their cams with the cam ends of the legs, releasing them to the position shown by the full lines in Fig. 1 and causing them by their weight as they rise to turn the heads H to bring the lower ends of the legs convergently toward the wheel. On releasing the handle E² its controlling-spring F acts to force the lever E, carrying the handle, to incline in a forward direction, where it is out of the way until it is obstructed at the stop $y$.

When a rider, after having lowered the legs I in the manner described to brace his bicycle, desires to leave it standing in the upright position without danger of its being ridden off, he may loosen the thumb-screw $m$ and take out the handle E², carrying it along with him, whereby the means for raising the legs are removed, thus affording a safeguard against having his bicycle ridden off by a thief.

As will be seen, my improved attachment, with the operating-handle near the steering mechanism of the bicycle, where it is in a position most conveniently accessible to the rider from his seat, may be controlled by him with the utmost ease to perform its functions for affording the advantages of a support when the bicycle is at rest and a brake when it is desired to use it for that purpose, say in climbing or descending a hill when the rider desires to rest during his progress without dismounting.

One of the more particular advantages incidental to the use of my improved attachment, and to which reference has not heretofore been made, relates to its use on a bicycle employed for military purposes, wherein the riding soldier may fire his weapon with steady aim from his seat on the bicycle when at rest.

The somewhat complicated nature of the mechanism involved in the construction of my improved attachment has rendered the foregoing minute description of the details necessary for the sake of enabling it to be readily comprehended. I do not, however, wish to be understood as intending that my invention is necessarily dependent upon these particular details, as the same ends may be accomplished by varying the construction and without departure from my invention.

What I claim as new, and desire to secure by Letters Patent, is—

1. In combination with a bicycle, a bracing attachment comprising arms depending at opposite sides of the rear wheel, spring-controlled bracing-legs pivotally supported on said arms to swing backward and forward, and provided with cams at their upper ends, cam-plates reciprocably supported to engage said leg-cams, and engaged by the leg-controlling springs, an operating-handle supported on the frame adjacent to the steering-post, and connections between the handle and said cam-plates for actuating them against the leg-cams, substantially as and for the purpose set forth.

2. In combination with a bicycle, a bracing attachment comprising arms pivotally supported on the lower bars of the rear fork of the bicycle-frame to swing back and forth with relation to the rear wheel, spring-controlled bracing-legs pivotally supported on said arms to swing backward and forward and provided with cams at their upper ends, cam-plates reciprocably supported to engage said leg-cams, and engaged by the leg-controlling springs, said cam-plates having beveled ends, stationary cams on said lower bars in the path of said beveled ends of the cam-plates, an operating-handle supported on the frame adjacent to the steering-post, and connections between the handle and said cam-plates for actuating them against the leg-cams, substantially as and for the purpose set forth.

3. In combination with a bicycle, a bracing attachment comprising sleeves $k$ on the bars $A^3$ and $A^4$ of the bicycle-frame and provided with cams $k^4$, cylindrical slotted heads H surrounding said sleeves and carrying pendent arms H' and H² having springs $f$ thereon, said arms H' containing elongated slots $g'$, collars $l$ on the bars $A^2$ of the frame and having finger extensions $l'$ connected with sleeves $k$ by wings $k'$ extending from the edges of its slot, legs I pivotally supported between said arms and having cams H and H' at their upper ends, cam-plates L reciprocably supported between said arms and beveled at their rear ends, lugs $g$ extending from the plates through said slots $g'$ and engaged by the springs $f$, an operating-handle supported on the frame adjacent to the steering-post, and connections between the handle and said cam-plates for actuating them against the leg-cams, substantially as and for the purpose set forth.

4. In combination with a bicycle, a bracing attachment having spring-controlled legs pivotally supported from the frame adjacent to the axle of the rear wheel to extend, and be swung for their adjustment backward and forward at opposite sides of said wheel, a ratchet and spring-dog device on the bicycle-frame adjacent to the steering-post, a pivotal yoke-bar carrying said dog, a spring-controlled operating-lever connected with said yoke-bar, and a connection between said yoke-bar and legs whereby the legs are adjusted on their pivots with relation to the ground by operating said lever, substantially as and for the purpose set forth.

5. In combination with a bicycle, a bracing attachment having spring-controlled legs pivotally supported from the frame adjacent to the axle of the rear wheel to extend, and be swung for their adjustment backward and forward, at opposite sides of said wheel, a segmental ratchet device fastened to the bicycle-frame near the steering-post, a yoke-bar B pivotally supported on said ratchet device and carrying a spring-dog D, an operating-lever E, fulcrumed to said yoke-bar and controlled by a spring F, a handle E² separably connected with the operating-lever, and a flexible connection between the yoke-bar and said legs, substantially as and for the purpose set forth.

6. In combination with a bicycle, a bracing attachment comprising arms depending at opposite sides of the rear wheel, spring-controlled bracing-legs pivotally supported on said arms to swing backward and forward and provided with cams at their upper ends, cam-plates reciprocably supported to engage said leg-cams and engaged by the leg-controlling springs, a ratchet device rigidly supported on the bicycle-frame adjacent to the steering-post, a yoke-bar B pivotally connected with said ratchet device and carrying a spring-dog D, a spring-controlled lever E fulcrumed on said yoke-bar and provided with an operating-handle E², and a flexible connection between said yoke-bar and said cam-plates, substantially as and for the purpose set forth.

7. In combination with a bicycle, a bracing attachment comprising arms pivotally supported on the lower bars of the rear fork of the bicycle-frame to swing back and forth with relation to the rear wheel, bracing-legs pivotally supported on said arms to swing backward and forward and provided with cams at their upper ends, spring-controlled cam-plates L, reciprocably supported to engage said leg-cams, said cam-plates having beveled ends, stationary cams on said lower bars in the path of said beveled ends of the cam-plates, a ratchet device rigidly fastened to the bicycle-frame near the steering-post, a yoke-bar B pivotally supported on said ratchet device and carrying a spring-dog device D, a spring-controlled operating-lever E provided with a handle E² and fulcrumed on said yoke-bar, and a flexible medium G, G', connecting said yoke-bar with said cam-plates, the whole being constructed and arranged to operate substantially as and for the purpose set forth.

8. In combination with a bicycle, a bracing attachment comprising, in combination the following elements: viz: collars $l$ on the frame-bars $A^2$ and having projecting fingers $l'$, sleeves $k$ on the frame-bars $A^3$, $A^4$, provided with cams $g'$, and wings $k'$ embracing said fingers, slotted cylindrical heads H surrounding said sleeves and carrying pendent arms containing slots $g'$, and carrying springs $f$, legs I pivoted to said arms and having cams $h, h'$ at their upper ends, cam-plates L beveled at their rear ends and carrying lugs $g$ confined in said slots $g'$, and engaged by the springs $f$, a ratchet device on the bicycle-frame adjacent to the steering-post, a yoke-bar B pivoted to said ratchet device and carrying a spring-dog device D, a spring-controlled lever E fulcrumed to said yoke-bar and provided with an operating-handle E², and a cord G, G', connecting said yoke-bar from its lower end with the forward ends of said cam-plates.

HERMAN LEINEWEBER.

In presence of—
J. H. LEE,
RICHARD SPENCER.